(12) United States Patent
Kodama et al.

(10) Patent No.: US 10,910,924 B2
(45) Date of Patent: Feb. 2, 2021

(54) MOTOR

(71) Applicant: Nidec Corporation, Kyoto (JP)

(72) Inventors: Mitsuo Kodama, Kyoto (JP);
Shunsuke Murakami, Kyoto (JP);
Takao Atarashi, Kyoto (JP); Yuya Saito, Kyoto (JP); Shingo Fukumoto, Kyoto (JP); Chiharu Kobayashi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 79 days.

(21) Appl. No.: 16/323,820

(22) PCT Filed: Aug. 9, 2017

(86) PCT No.: PCT/JP2017/028977
§ 371 (c)(1),
(2) Date: Feb. 7, 2019

(87) PCT Pub. No.: WO2018/030480
PCT Pub. Date: Feb. 15, 2018

(65) Prior Publication Data
US 2020/0195097 A1 Jun. 18, 2020

(30) Foreign Application Priority Data
Aug. 12, 2016 (JP) .................... 2016-158339

(51) Int. Cl.
*H02K 11/33* (2016.01)
*H02K 3/04* (2006.01)
(Continued)

(52) U.S. Cl.
CPC ............... *H02K 11/33* (2016.01); *H02K 3/04* (2013.01); *H02K 3/38* (2013.01); *H02K 3/505* (2013.01)

(58) Field of Classification Search
CPC ............. H02K 11/33; H02K 3/04; H02K 3/38
(Continued)

(56) References Cited

U.S. PATENT DOCUMENTS 9,893,586 B2 2/2018 Tomizawa et al.
2001/0054853 A1* 12/2001 Hayashi ................ H02K 5/225
310/71

(Continued)

OTHER PUBLICATIONS

Official Communication issued in International Patent Application No. PCT/JP2017/028977, dated Nov. 7, 2017.

*Primary Examiner* — Terrance L Kenerly
(74) *Attorney, Agent, or Firm* — Keating & Bennett

(57) ABSTRACT

A motor includes a rotor including a shaft centered on a center axis extending vertically, a stator that is radially opposed to the rotor and includes coils, a conductive holder accommodating the rotor and the stator and including a penetration unit penetrating axially, and a coil lead wire support that is at least partially disposed in the penetration unit, includes a coil lead wire insertion hole into which coil lead wires extending from the coils are provided, and is made of an insulating material. The coil lead wire support includes a base and a fitting unit extending downward from the base, at least one of a circumferential length and a radial length of the fitting unit being shorter than the base, and the coil lead wire insertion hole is in the base and the fitting unit, and the coil lead wire is inserted into the coil lead wire insertion hole.

11 Claims, 18 Drawing Sheets

(51) Int. Cl.
*H02K 3/38* (2006.01)
*H02K 3/50* (2006.01)

(58) Field of Classification Search
USPC .......................................................... 310/71
See application file for complete search history.

(56) References Cited

U.S. PATENT DOCUMENTS

2012/0286604 A1   11/2012  Abe et al.
2014/0152130 A1*   6/2014  Shimano .............. H02K 11/048
                                                310/71

* cited by examiner

MOTOR

BACKGROUND OF THE INVENTION

1. Field of the Invention

The present invention relates to a motor.

2. Description of the Related Art

Conventionally, there is a motor in which a seal member supporting a coil wire is disposed on a top surface of a housing holding a bearing when the motor and a control board are connected by the coil wire. For example, Japanese Unexamined Patent Application Publication No. 2015-144507 discloses the motor including the seal member.

However, in the motor described in Japanese Unexamined Patent Application Publication No. 2015-144507, because an insulating process is not performed between the side surface of the housing and the coil wire, there is a risk that the side surface of the housing and the coil wire are brought into contact with each other to generate a short circuit.

Additionally, deformation such as a sink marks or a curvature may be generated during molding of the seal member, which may cause a phenomenon in which the coil wire is hardly inserted into the seal member.

SUMMARY OF THE INVENTION

According to an example embodiment of the present disclosure, a motor includes a rotor including a shaft centered on a center axis extending vertically; a stator that is radially opposed to the rotor and includes a plurality of coils; a bearing supporting the shaft; a holder that is made of a conductive material, accommodates the rotor and the stator, and includes a penetration unit penetrating axially; and a coil lead wire support that is at least partially disposed in the penetration unit, includes a coil lead wire insertion hole into which a plurality of coil lead wires extending from the plurality of coils are inserted, and is made of an insulating material. The coil lead wire support includes a base; and a fitting unit extending downward from the base, at least one of a circumferential length and a radial length of the fitting unit being shorter than the base, and the coil lead wire insertion hole is provided in the base and the fitting unit, and the coil lead wire is inserted into the coil lead wire insertion hole.

According to the example embodiment of the present disclosure, a short circuit between the holder and the coil lead wire is reduced or prevented by providing the fitting unit.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, an exemplary embodiment of the invention will be described with reference to the drawings. However, the following embodiment is merely an example of the present invention, but does not interpret the technical scope of the present invention to a limited extent. In each of the drawings, an identical component is denoted by an identical reference sign, and sometimes the description is omitted.

In the following description, a center axis of rotation of a rotor in a motor is denoted by a reference sign C. A direction in which the center axis C extends is defined as a vertical direction. However, the vertical direction in the description is a term used merely for the description, and does not limit an actual positional relationship or the direction. That is, a gravity direction is not necessarily a downward direction. In the description, a direction parallel to a rotation axis of the motor is referred to as an "axial direction", a direction orthogonal to the rotation axis of the motor is referred to as a "radial direction", and a direction along an arc centered on the center axis of the motor is referred to as a "circumferential direction".

In the description, the term "extending axially" includes not only a state of extending strictly in the axial direction but also a state of extending in a direction inclined with respect to the axial direction by an angle less than or equal to 45 degrees. Similarly, in the description, the term "extending radially" includes not only a state of extending strictly in the radial direction but also a state of extending in a direction inclined with respect to the radial direction by the angle less than 45 degrees.

Figure 1:
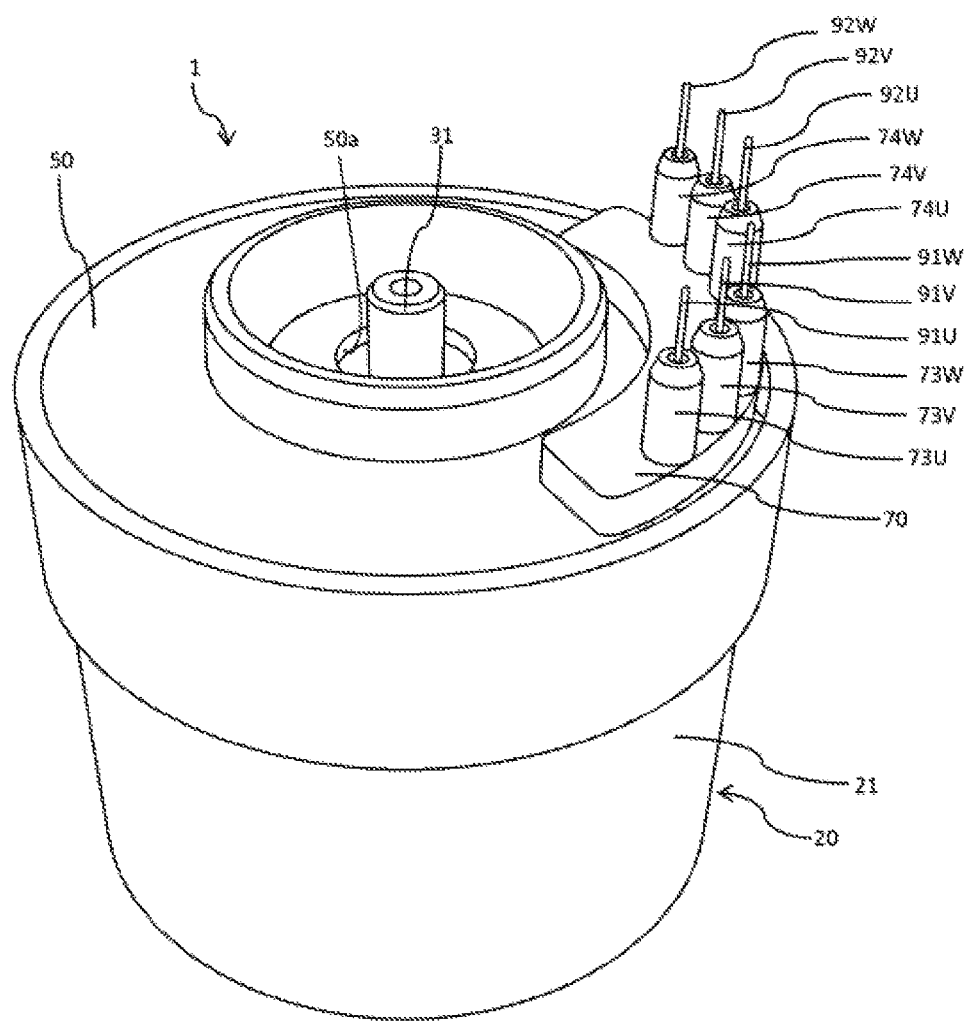
FIG. 1 is a perspective view illustrating an external appearance of a motor according to an example embodiment of the present invention.
Figure 2:
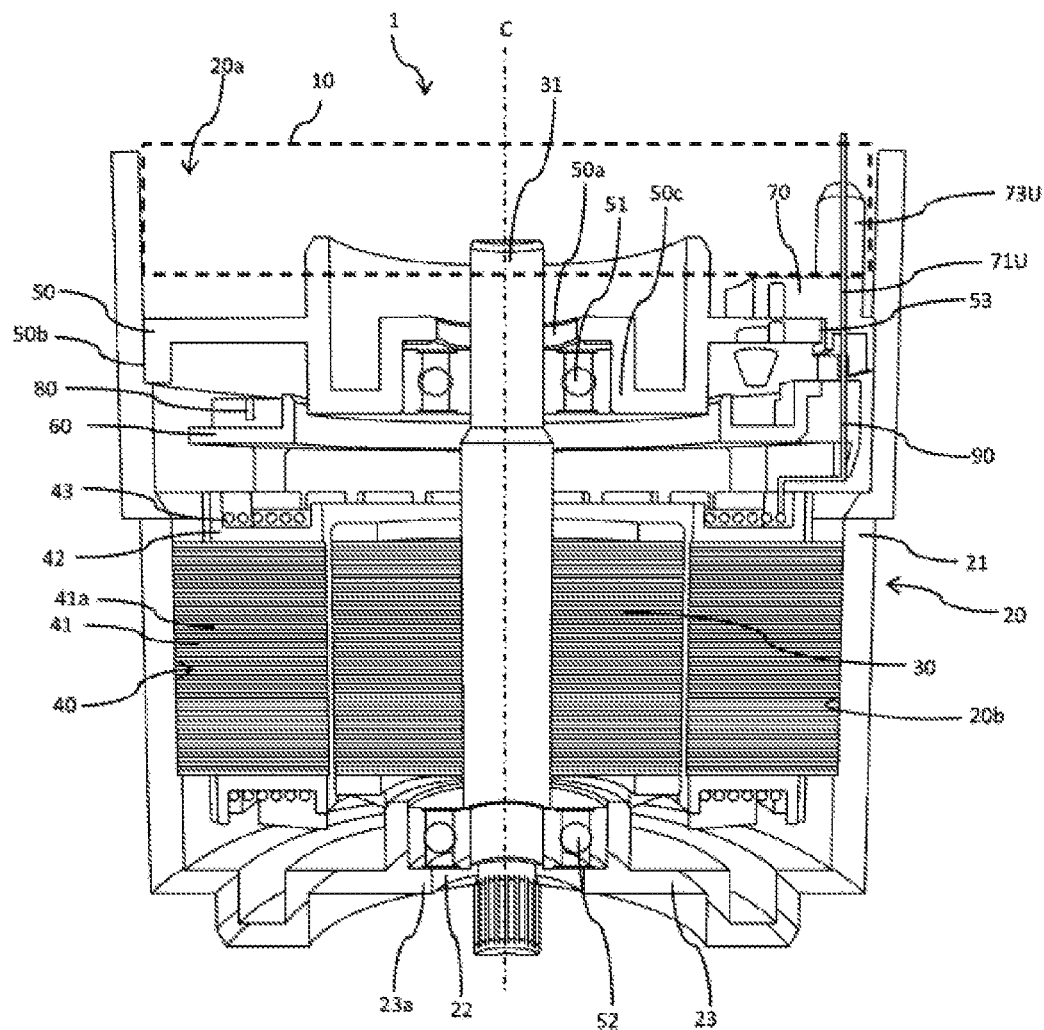
FIG. 2 is a sectional view of the motor.
Figure 3:
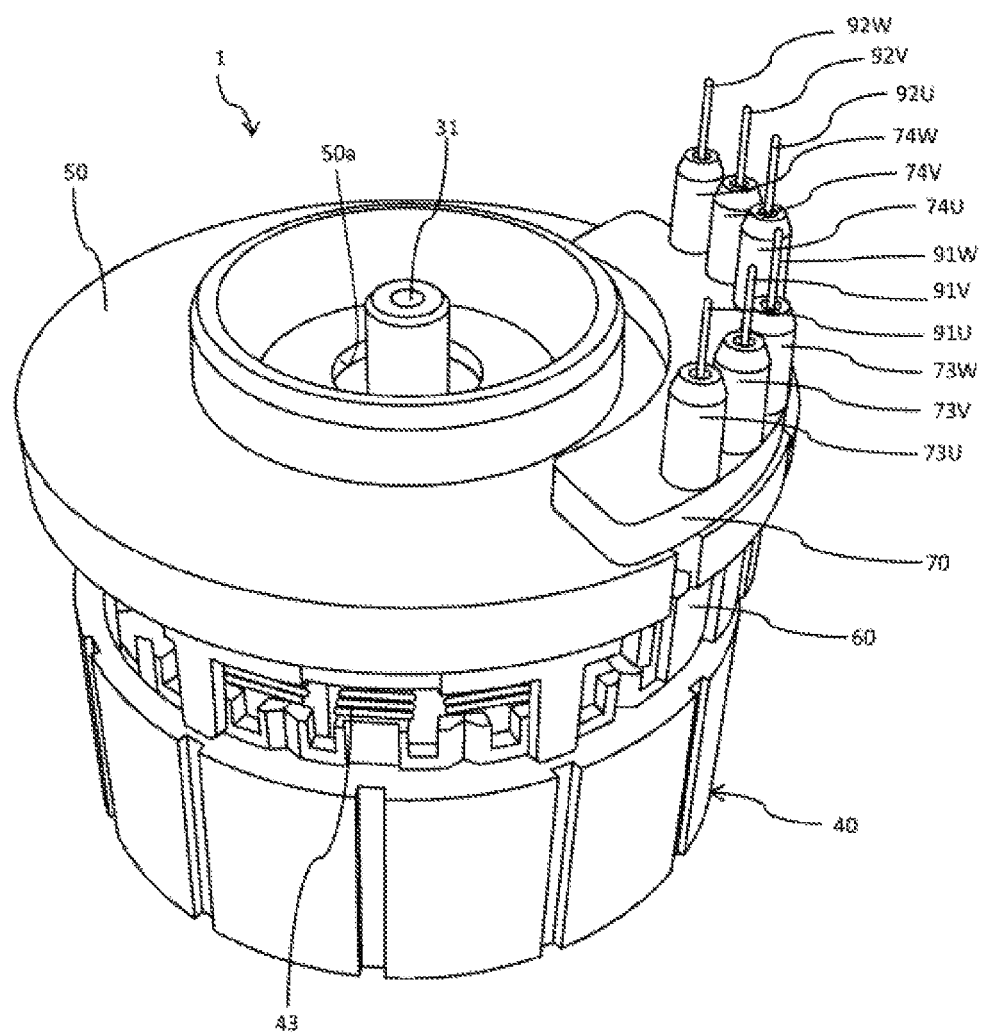
FIG. 3 is a perspective view illustrating a state in which a holder tube and a holder bottom are removed from the motor.
Figure 4:
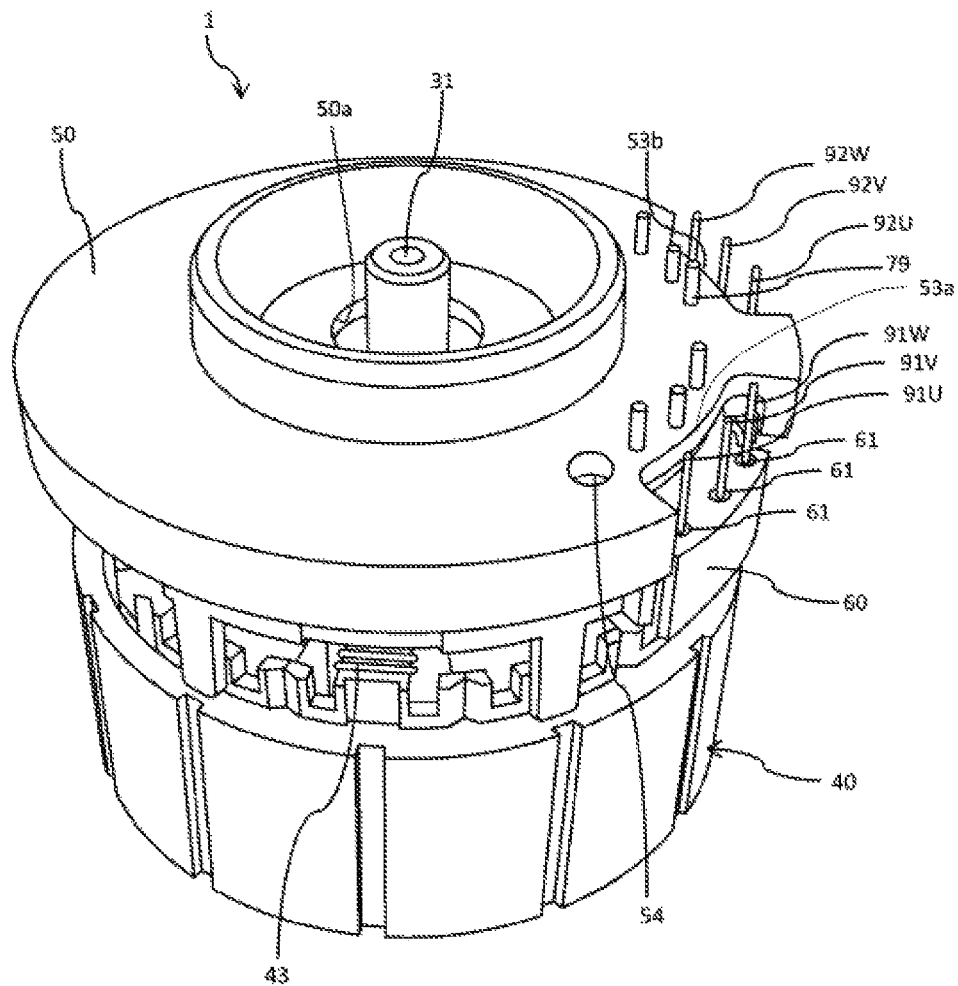
FIG. 4 is a perspective view illustrating the state in which the holder tube, the holder bottom, and a coil lead wire supporting member are removed from the motor.
Figure 5:
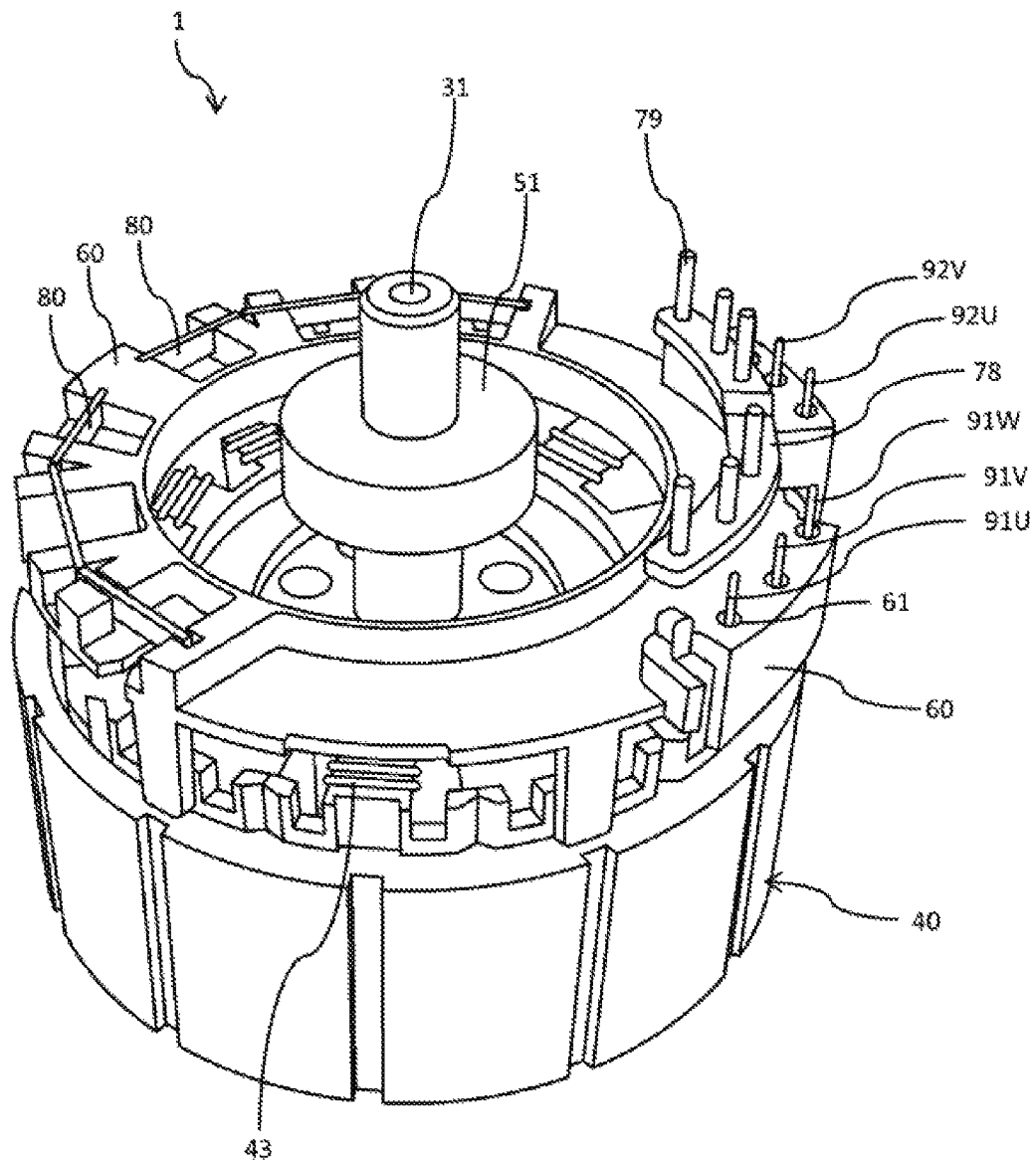
FIG. 5 is a perspective view illustrating the state in which the holder tube, the holder bottom, a holder upper unit, and the coil lead wire supporting member are removed from the motor.

FIG. 1 is a perspective view illustrating an external appearance of a motor 1 according to an embodiment. FIG. 2 is a sectional view of the motor 1. FIG. 3 is a perspective view illustrating the external appearance of the motor 1 in a state in which a holder tube and a holder bottom are removed. FIG. 4 is a perspective view illustrating the external appearance of the motor 1 in a state in which the holder tube, the holder bottom, and a coil lead wire supporting member are removed. FIG. 5 is a perspective view illustrating the external appearance of the motor in a state in which the holder tube, the holder bottom, the holder upper unit, and the coil lead wire supporting member are removed. In FIG. 1, a part of an upper side of a holder tube 21 is not illustrated in order to easily see components of the motor.

As illustrated in FIGS. 1 to 5, the motor 1 includes a holder 20, a rotor 30, a stator 40, an upper bearing 51, a lower bearing 52, a bus bar supporting member 60, a coil lead wire supporting member 70, a fixing member 78, a bus bar 80, and a controller 10. Coil lead wires 91U, 91V, 91W, 92U, 92V, and 92W (hereinafter, also referred to as "coil lead wires 91U to 91W" or a "coil lead wire 90") are drawn from the coil lead wire supporting member 70.

The holder 20 includes the holder tube 21 extending vertically into a tubular shape and a holder bottom 23 located below the holder tube 21. The holder 20 is made of a conductive material such as metal. The holder 20 accommodates the rotor 30, the stator 40, and the like. The holder 20 includes an opening 20a on an upper side. The holder tube 21 has a cylindrical shape centered on the center axis C. A holder upper unit 50 is disposed in the holder tube 21. In the embodiment, the holder upper unit 50 has a substantial disc shape. An inner circumferential surface 20b of the holder tube 21 contacts with an outer circumferential surface 50b of the holder upper unit 50 and an outer circumferential surface of the stator 40. The holder tube 21 is fixed to the holder upper unit 50 and the stator 40. The coil lead wire supporting member 70 and the controller 10 are disposed inside the holder 20 and above the holder upper unit 50. More particularly, a part of a lower side of the coil lead wire supporting member 70 invades into penetration units 53a and 53b (to be described later) of the holder upper unit 50.

The holder tube 21 does not necessarily have the cylindrical shape, but may have any shape such as a box shape as long as the stator 40 and the holder upper unit 50 can be fixed to the inner circumferential surface of the holder tube 21. The holder tube 21 may have a combined shape of a cylindrical shape and another shape such as a box shape. The inner circumferential surface 20b of the holder tube 21 needs not to contact with the stator 40 and the holder upper unit 50 over the entire circumference, but a part of the inner circumferential surface 20b may contact with the stator 40 and the holder upper unit 50.

The holder bottom 23 is disposed below the stator 40, and includes a lower bearing support 23a supporting the lower bearing 52 and an output shaft hole 22 axially penetrating the holder bottom 23.

In the embodiment, the holder tube 21 and the holder bottom 23 are a single member, and the holder upper unit 50 is a separate member. However, the holder tube 21 and the holder upper unit 50 may be a single member, and the holder bottom 23 may be a separate member. The holder tube 21, the holder bottom 23, and the holder upper unit 50 may be separate members.

Figure 6:
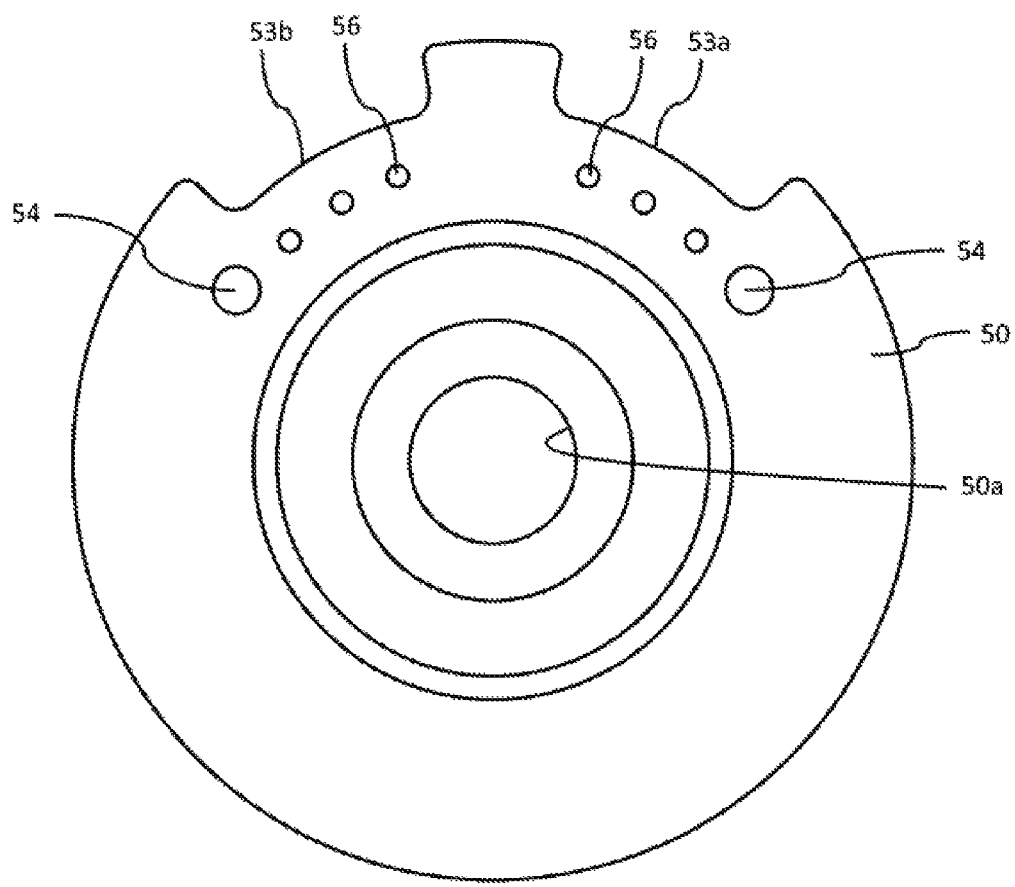
FIG. 6 is a plan view illustrating the holder upper unit excluding the coil lead wire supporting member when the holder upper unit is viewed from above.
Figure 7:
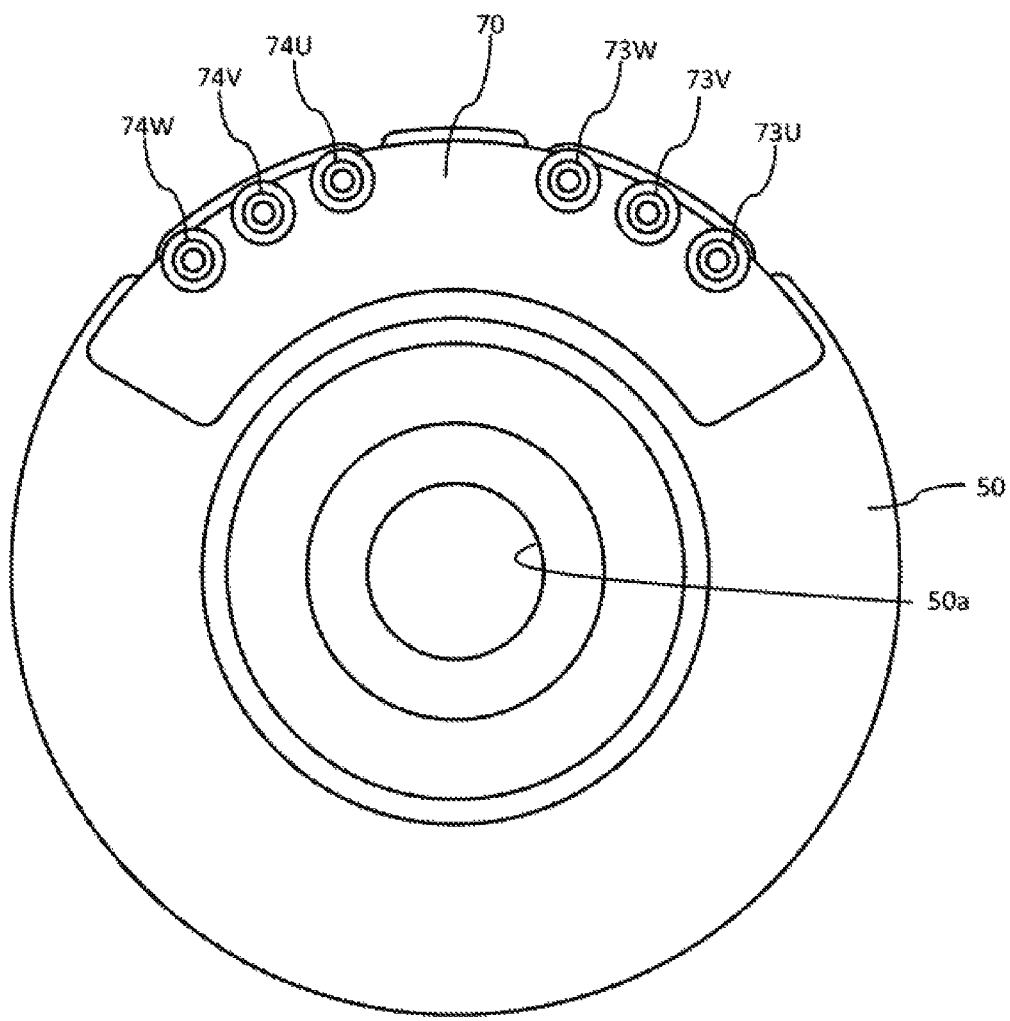
FIG. 7 is a perspective view illustrating the holder upper unit when the holder upper unit is viewed from above.
Figure 8:
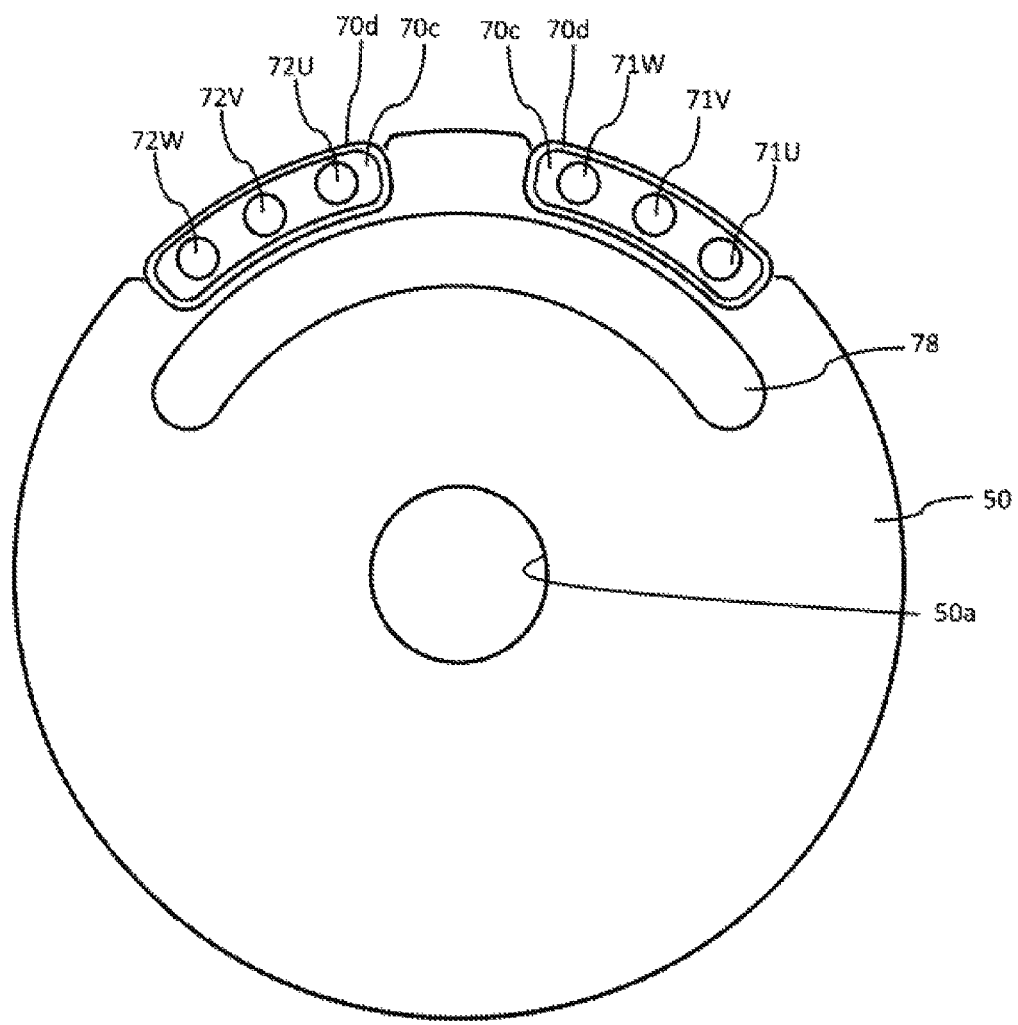
FIG. 8 is a perspective view illustrating the holder upper unit when the holder upper unit is viewed from below.

FIG. 6 is a plan view illustrating the holder upper unit 50 of the embodiment when the holder upper unit 50 is viewed from above. FIG. 7 is a perspective view illustrating the holder upper unit 50 when the holder upper unit 50 is viewed from above. FIG. 8 is a perspective view illustrating the holder upper unit 50 when the holder upper unit 50 is viewed from below. In FIGS. 7 and 8, the coil lead wire supporting member 70 and the fixing member 78 are attached to the holder upper unit 50.

As illustrated in FIGS. 4 and 6 to 8, the holder upper unit 50 has the disc shape including the penetration units 53a and 53b. As illustrated in FIG. 2, the holder upper unit 50 is disposed above the stator 40. The holder upper unit 50 includes an opening 50a around the center axis C. The opening 50a is a through hole axially penetrating the holder upper unit 50. At least a part of a shaft 31 is positioned inside the opening 50a. The holder upper unit 50 supports the upper bearing 51. The outer circumferential surface 50b of the holder upper unit 50 contacts with the inner circumferential surface 20b of the holder tube 21, and the holder upper unit 50 is fixed to the holder tube 21. In the embodiment, the holder upper unit 50 is fixed to the holder tube 21 by shrinkage fitting. The holder upper unit 50 may be fixed to the holder tube 21 by another method such as press fitting.

As illustrated in FIGS. 3 and 6, the penetration units 53a and 53b of the holder upper unit 50 have a shape that extends circumferentially while being cut out from the outer circumferential surface side of the holder upper unit 50 toward the radial inside. The "outer circumferential surface" of the holder upper unit 50 means an outer circumferential portion of a cylinder centered on the center axis C, and does not include a surface in which the penetration units 53a and 53b are opposed to the holder tube 21. As illustrated in FIGS. 3, 7, and 8, the coil lead wire supporting member 70 is disposed at positions of the penetration units 53a and 53b. In the penetration units 53a and 53b, the coil lead wires 91U to 92W are passed from the lower side toward the upper side while supported by the coil lead wire supporting member 70. The holder upper unit 50 includes a recess 54 recessed from the upper side toward the lower side. The holder upper unit 50 includes a plurality of fixing through-holes 56.

The penetration units 53a and 53b are not limited to the notch shape of the embodiment, but may be any notch shape as long as at least one of the coil lead wires 91U to 92W passes through the notch from the lower side to the upper side of the holder upper unit 50. The penetration units 53a and 53b may be any notch as long as at least one of the coil lead wires 91U to 92W passes through the notch from the lower side to the upper side of the holder upper unit 50, and the coil lead wires 91U to 92W are not necessarily passed. In this case, the coil lead wires 91U to 92W that do not pass through the penetration unit 53a or 53b may be inserted into the through-hole made in the holder upper unit 50 separately from the penetration unit 53a or 53b.

The penetration unit may be a through-hole penetrating the holder upper unit 50 instead of the notch shape. In this case, at least a part of the coil lead wire supporting member 70 is disposed in the through-hole. In the through-hole, the coil lead wires 91U to 92W are passed from the lower side toward the upper side while supported by the coil lead wire supporting member 70.

In the embodiment, the upper bearing 51 and the lower bearing 52 are a ball bearing. The upper bearing 51 and the lower bearing 52 support the shaft 31 such that the shaft 31 is circumferentially rotatable about the center axis C. The upper bearing 51 is supported by an upper bearing support 50c of the holder upper unit 50. The lower bearing 52 is supported by a lower bearing support 23a of the holder bottom 23. The upper bearing 51 and the lower bearing 52 may be another type bearing other than the ball bearing.

The rotor 30 includes the shaft 31. In the embodiment, the shaft 31 has a substantially columnar shape. The shaft 31 extends vertically along the center axis C. The shaft 31 need not be solid but may be hollow.

As illustrated in FIGS. 2 to 5, the stator 40 is disposed inside the holder 20 and radially outside the rotor 30. In other words, the stator 40 circumferentially surrounds the rotor 30. The stator 40 includes a stator core 41, an insulator 42, and a coil 43. The stator core 41 is formed of a laminated steel plate in which electromagnetic steel plates are axially laminated. In the embodiment, the stator core 41 has an annular shape centered on the center axis C. A plurality of teeth 41a extending radially inward are disposed in an inside surface of the stator core 41. The teeth 41a are circumferentially arranged at intervals in the inside surface of the stator core. The insulator 42 is made of an insulator such as resin, and attached to each tooth 41a. The coil 43 is constructed with a conducting wire wound around each tooth 41a with the insulator 42 interposed therebetween, and disposed in each tooth 41a. As described above, the outer circumferential surface of the stator 40 is fixed to the inner circumferential surface 20b of the holder 20. The stator 40 includes the conducting wire extending from the circumferentially-arranged coils 43. The conducting wire is sometimes referred to as a coil lead wire. However, in the embodiment, the conducting wire is simply referred to as a conducting wire in order to distinguish the conducting wire from the coil lead wires 91U to 92W penetrating the coil lead wire supporting member 70.

The bus bar supporting member 60 supports the bus bar 80. The bus bar 80 is a conductive member electrically connecting the lead wires led out from the coil 43 at a necessary place. The bus bar supporting member 60 is an insulating resin member, and can prevent the bus bar 80 and the conductive member disposed around the bus bar 80 from coming into contact with each other to generate a short circuit.

Figure 9:
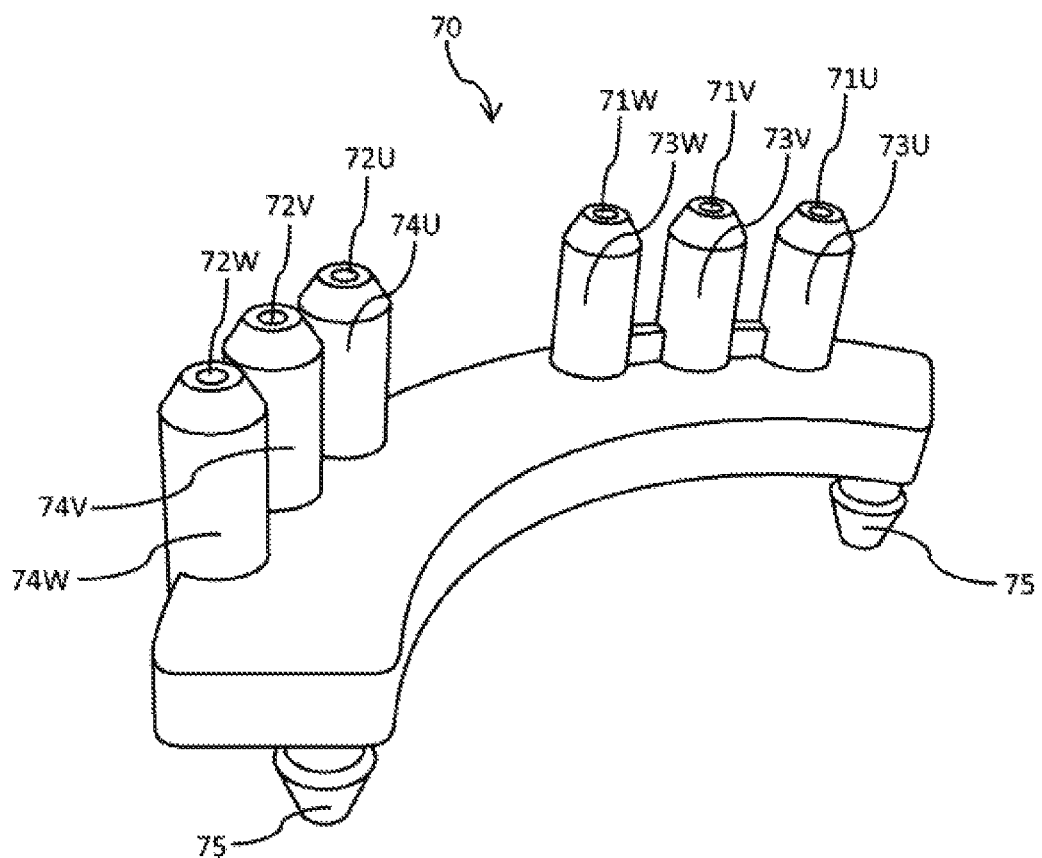
FIG. 9 is a perspective view illustrating the coil lead wire supporting member when the coil lead wire supporting member is viewed from above.
Figure 10:
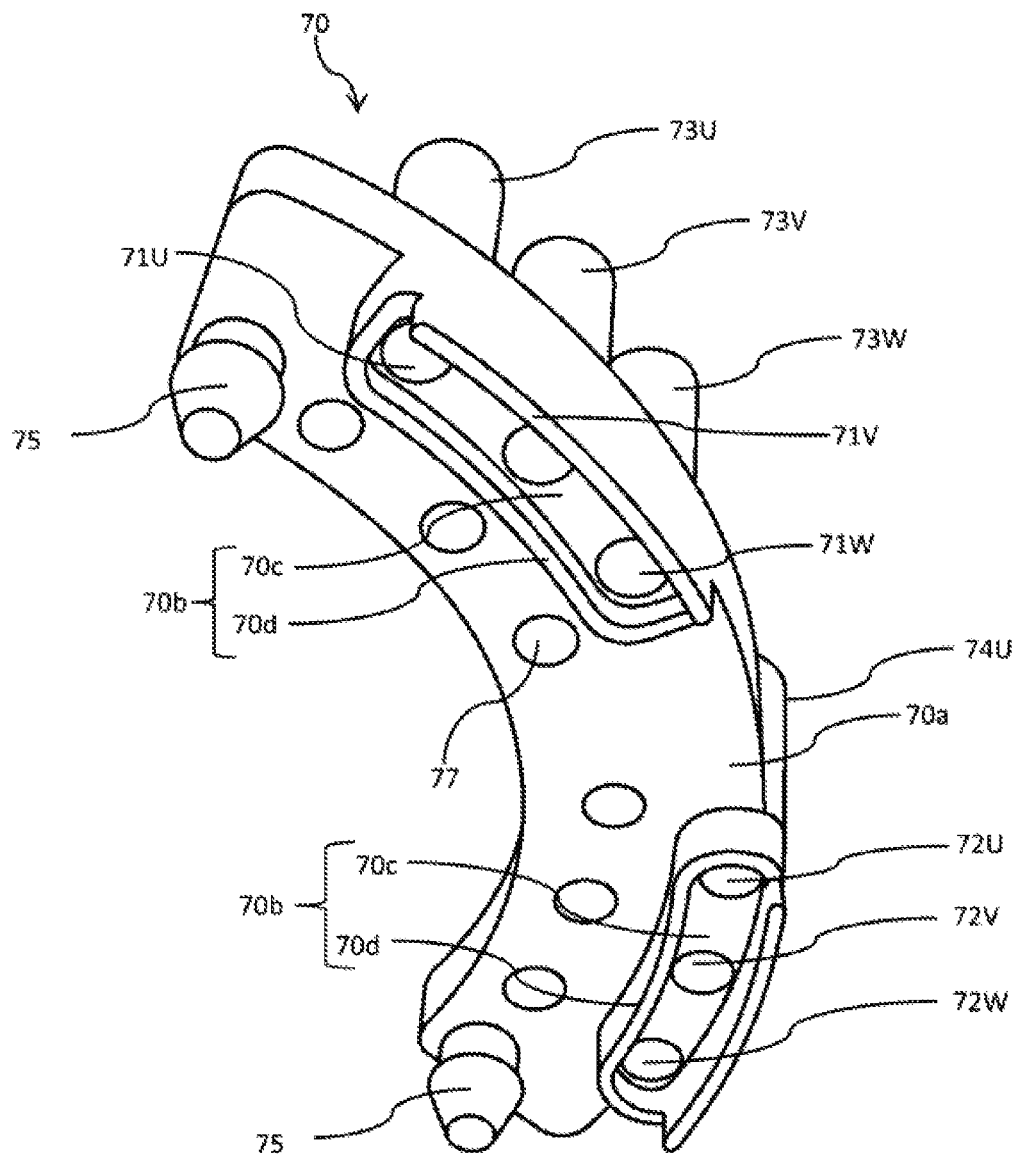
FIG. 10 is a perspective view illustrating the coil lead wire supporting member when the coil lead wire supporting member is viewed from below.

The coil lead wire supporting member 70 is disposed on the upper side of the holder upper unit 50, and covers the penetration units 53a and 53b. At least a part of the coil lead wire supporting member 70 is inserted into the penetration units 53a and 53b. The coil lead wire supporting member 70 is made of a resin material having insulation (for example, an insulating rubber material), and can prevent the coil lead wires 91U to 92W from coming in contact with each other to generate the short circuit and from contacting with another conductive member to generate the short circuit. As illustrated in FIGS. 9 and 10, the coil lead wire supporting member 70 includes coil lead wire insertion holes 71U, 71V, 71W, 72U, 72V and 72W (hereinafter, sometimes referred to as "coil lead wire insertion holes 71U to 72W" or a "coil lead wire insertion hole 71").

Figure 11:
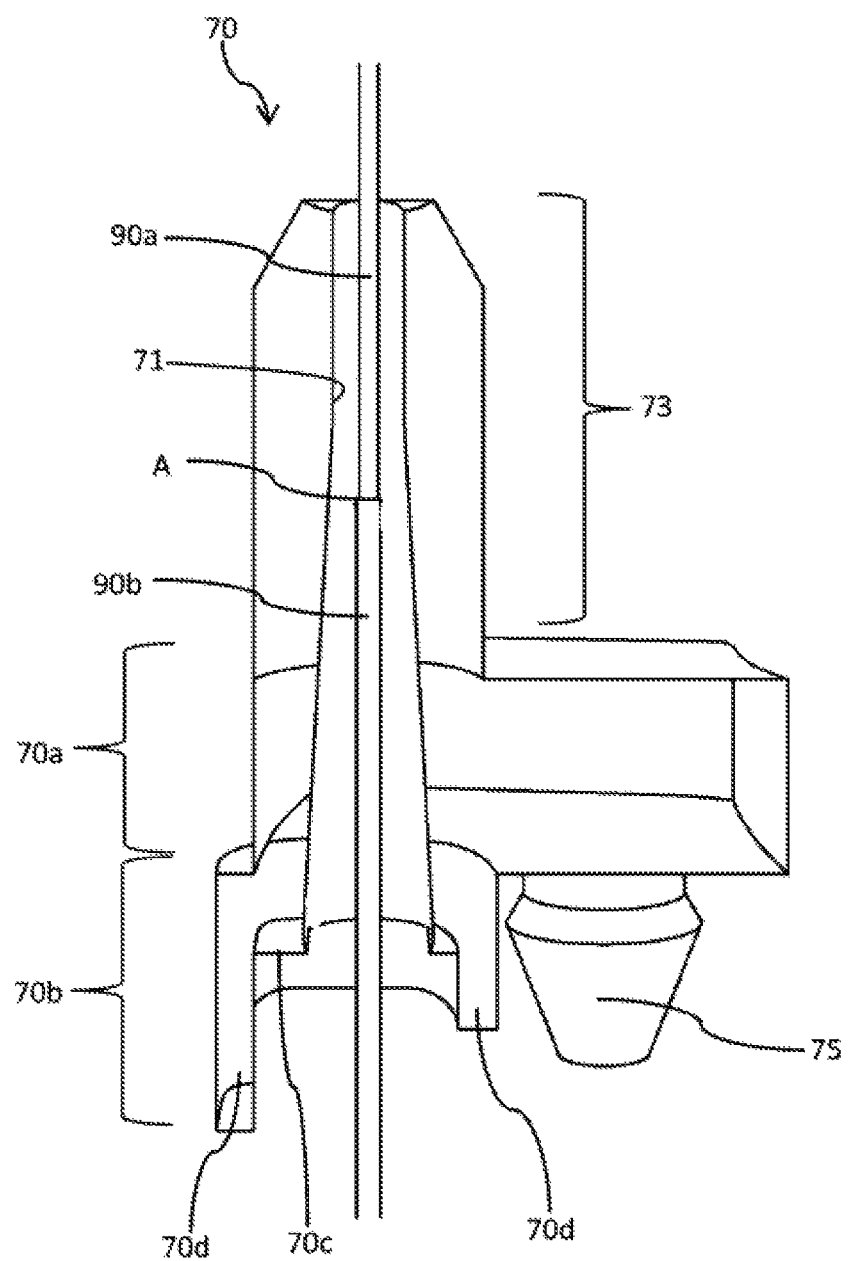
FIG. 11 is a side view illustrating a section of the coil lead wire supporting member.

FIG. 11 is a partially sectional view of the coil lead wire supporting member 70. As illustrated in FIGS. 7 to 11, the coil lead wire supporting member 70 includes a protrusion 73, a base 70a, a fitting unit 70b, and a protrusion 75. The protrusion 73 is a generic term for protrusions 73U to 74W. The protrusions 73U, 73V, 73W, 74U, 74V, and 74W (sometimes referred to as "protrusions 73U to 74W") protrude upward from the base 70a.

Two fitting units 70b are disposed on the lower side of the base 70a, and each fitting unit 70b includes a bottom surface 70c and a wall 70d. As illustrated in FIGS. 8 and 10, at least one of the circumferential direction and the radial direction of the fitting unit 70b is shorter than the base 70a in planar view. That is, in the axial direction, a projected area of the fitting unit 70b is smaller than that of the base 70a.

As illustrated in FIG. 8, the outside surface of the fitting unit 70b contacts with the inside surfaces of the penetration units 53a and 53b. Consequently, the coil lead wire supporting member 70 can be fixed to the holder upper unit 50. The outside surface of the fitting unit 70b may contact with the inside surfaces of the penetration units 53a and 53b over the entire circumference, or contact partially with the inside surfaces of the penetration units 53a and 53b. The wall 70d has a tubular shape extending downward from the outside surface of the bottom surface 70c (see FIGS. 8, 10, and 11). As illustrated in FIG. 11, the coil lead wire insertion hole 71 penetrates from the bottom surface 70c of the coil lead wire supporting member 70 to the upper end of the protrusion 73 through the fitting unit 70b and the base 70a.

The fitting unit 70b may have a protrusion shape including a downwardly protruding through-hole into which the coil lead wire is inserted, instead of or in addition to the wall 70d.

The protrusion 75 protrudes downward from the base 70a. As illustrated in FIG. 6, the holder upper unit 50 includes the recess 54 at the upper position opposed to the protrusion 75. The protrusion 75 of the coil lead wire supporting member 70 is vertically fitted in the recess 54 of the holder upper unit 50. The protrusion 75 is fixed in the recess 54 by light press fitting or the like. Consequently, the coil lead wire supporting member 70 and the holder upper unit 50 are fixed to each other. The coil lead wire supporting member 70 includes the two protrusions 75, so that the coil lead wire supporting member 70 and the holder upper unit 50 can more surely be fixed to each other. The holder upper unit 50 may include a hole that is fitted to the protrusion 75 instead of the recess 54. The coil lead wire supporting member 70 may include at least three protrusions 75.

As illustrated in FIGS. 1 to 3, the coil lead wires 91U to 92W are inserted into the coil lead wire insertion holes 71U to 72W from the lower side to the upper side of the holder upper unit 50, respectively. The coil lead wire insertion holes 71U to 72W are circumferentially arranged into a concentric arc shape centered on the center axis C. Because the coil lead wire supporting member 70 includes the fitting unit 70b, the coil lead wires 91U to 92W can be prevented from coming into contact with the holder 20 to generate the short circuit, and deformation such as a sink mark is prevented in the base 70a during the formation. The coil lead wire supporting member 70 includes the base 70a, the coil lead wire supporting member 70 can be prevented from falling out of the holder upper unit 50. Consequently, in manufacturing the motor, a worker or the like can easily insert the coil lead wires 91U to 92W into the coil lead wire insertion holes 71U to 72W of the coil lead wire supporting member 70, thereby reducing a process of manufacturing process of the motor.

The fitting unit 70b has a hollow shape including the bottom surface 70c and the wall 70d, a material used to form the coil lead wire supporting member 70 can be reduced as compared with the case that the fitting unit 70b is formed into a protrusion shape that is not formed into the hollow shape. In the coil lead wire supporting member 70, the fitting unit 70b can be thinned as compared with the shape in which the fitting unit 70b is not hollowed, so that the deformation such as a sink mark can be prevented in molding the base 70a.

In the motor 1, the coil lead wire supporting member 70 includes the protrusion 73, so that the coil lead wires 91U to 92W can be supported while electrically insulated from the controller 10.

In the motor 1, the outside surface of the fitting unit 70b contacts with the inside surfaces of the penetration units 53a and 53b, so that the holder upper unit 50 can be insulated from the coil lead wire supporting member 70.

The coil lead wire supporting member 70 includes one base 70a and two fitting units 70b, so that the coil lead wire supporting member 70 and the holder upper unit 50 can be firmly fixed to each other. The coil lead wire supporting member 70 may include at least three fitting units 70b with respect to one base 70a. In particular, in the case that the number of the penetration units and the number of the fitting units are increased, the coil lead wire supporting member 70 hardly falls out of the holder upper unit 50.

The fixing member 78 is made of a resin material having insulation. As illustrated in FIGS. 5 and 8, the fixing member 78 has a substantially arc shape in planar view. The fixing member 78 is disposed on the lower side of the holder upper unit 50. The fixing member 78 includes a fixing protrusion 79 protruding upward. The fixing protrusion 79 penetrates the fixing through-hole 56 of the holder upper unit 50 from the lower side to the upper side, is inserted into the recess 77 on the lower side of the coil lead wire supporting member 70, and is fixed by heat welding or the like. The recess 77 may be a through-hole.

The fixing member 78 sandwiches the holder upper unit 50 with the coil lead wire supporting member 70. That is, for example, the metal holder upper unit 50 is sandwiched between the resin fixing member 78 and the resin coil lead wire supporting member 70. Consequently, the resin fixing member 78 and the resin coil lead wire supporting member 70 are strongly fixed to each other by heat welding or the like. In the embodiment, the fixing member 78 and the coil lead wire supporting member 70 are made of an identical resin material. For this reason, even if heat generated inside the motor is conducted to the fixing member 78 and the coil lead wire supporting member 70, the deformation or breakage due to an influence of a difference in thermal expansion coefficient can be prevented in the fixing member 78 and the coil lead wire supporting member 70.

The coil lead wire 90 (91U to 92W) is a conducting wire drawn from the conducting wire of the coil 43. As illustrated in FIG. 2, the coil lead wire 90 (91U to 92W) is drawn from the stator 40, and inserted into the through-hole 61 (see FIG. 4) of the bus bar supporting member 60 and the coil lead wire insertion holes 71U to 72W from the lower side toward the upper side. The coil lead wires 90 (91U to 92W) are electrically connected to the controller 10 by soldering or the like. The motor 1 of the embodiment has a two-system configuration having two pairs of a U-phase, a V-phase, and a W-phase. In driving the motor, current is passed through the coil lead wires 91U to 91W constituting the U-phase, the V-phase, and the W-phase in the first system, and current is also passed through the coil lead wires 92U to 92W constituting the U-phase, the V-Phase, and the W-phase in the second system. With this configuration, in driving the motor, even if energization to the coil of one system is stopped due to a failure of an inverter, the coil of the other system can be energized, so that the motor can be rotated.

Although the motor of the embodiment has the two-system configuration having the two pairs of the U-phase, the V-phase, and the W-phase, any number of systems can be designed. That is, in the motor 1, a configuration of one system or at least three systems can be adopted.

As illustrated in FIG. 11, the coil lead wire 90 is inserted into the coil lead wire insertion hole 71 of the coil lead wire supporting member 70. As illustrated in FIG. 11, an inner diameter is decreased in at least a part of the upper side of the coil lead wire insertion hole 71. The coil lead wire 90 inside the coil lead wire insertion hole 71 includes an insulating unit 90b including an insulating film at the position below a boundary A in the protrusion 73 in which the inner diameter is narrowed and a conductive unit 90a in which the insulation coating has peeled off at the position above the boundary. For this reason, the inner diameter of the coil lead wire 90 is increased at the position below the boundary A. In the coil lead wire insertion hole 71, the inner diameter is smaller than that of the insulating unit 90b at the position of the boundary A, and the coil lead wire 90 contacts with the inside of the coil lead wire insertion hole 71 at the boundary A. That is, an outer diameter of the insulating unit 90b is larger than the inner diameter of the coil lead wire insertion hole 71. Consequently, in the coil lead wire insertion hole 71, the insulating unit 90b is held by light press fitting.

Because the surface of the coil lead wire 90 becomes a conductor at a position above the boundary A on the inside of the protrusion 73, a friction coefficient of the coil lead wire 90 is smaller as compared with the case that the insulating film exists on the surface of the coil lead wire 90 to form an insulator. Consequently, in manufacturing the motor, a worker or the like can easily insert the coil lead wire 90 into the coil lead wire insertion hole 71. The surface of the coil lead wire 90 is the conductor, so that the coil lead wire 90 and the coil lead wire supporting member 70 can be firmly be connected to each other in the case that an adhesive is used. The insulating unit 90b is held by light press fitting in the coil lead wire insertion hole 71, so that the coil lead wire 90 can be prevented from falling out of the coil lead wire insertion hole 71.

The controller 10 is disposed inside the holder 20 and above the holder upper unit 50. The controller 10 is a circuit board on which various electronic components such as a switching element are mounted. In the embodiment, for example, the controller 10 is a rigid board. For example, the controller 10 has a rectangular shape having ends on all sides. An external power source or the like (not illustrated) supplies necessary driving power to each of the coil lead wires 91U to 92W through the controller 10. An inverter circuit that drives the motor 1 and the like are mounted on the controller 10. As described above, the coil lead wires 91U to 92W are drawn upward through the penetration units 53a and 53b located radially outside the holder upper unit 50. For this reason, when the controller 10 is disposed inside the holder 20, the coil lead wires 91U to 92W can electrically be connected to the vicinity of the end of the controller 10. As a result, a space where the wiring and the electronic component are disposed can widely be secured on the controller 10. The coil lead wire is drawn through the coil lead wire supporting member and the notch, so that a space where the coil lead wire is drawn can be reduced to miniaturize the motor.

The controller 10 may not necessarily be disposed inside the holder 20, but may be disposed outside the holder 20. For example, the controller 10 may be disposed on the upper side of the holder upper unit 50 and on the radial inside of the inside surface of the holder 20. Even if the controller 10 is disposed in this way, the coil lead wires 91U to 92W can be electrically connected to the vicinity of the end of the controller 10, and a relatively wide disposition space of the controller 10 can be secured.

The motor 1 is not limited to the embodiment, but includes various configurations conceivable from the embodiment. For example, the motor 1 may have configurations of the following modifications. The configuration identical to that of the embodiment is denoted by an identical name or a reference sign, and sometimes the description is omitted.

Figure 12:
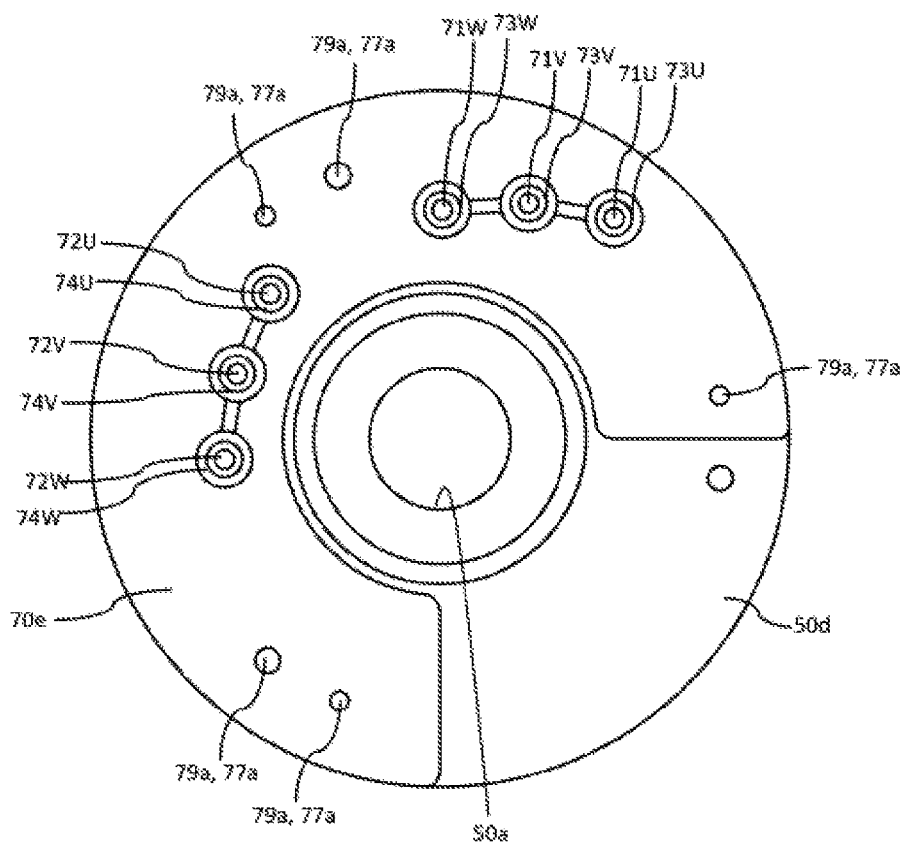
FIG. 12 is a plan view of a holder upper unit according to a modification when the holder upper unit is viewed from above.
Figure 13:
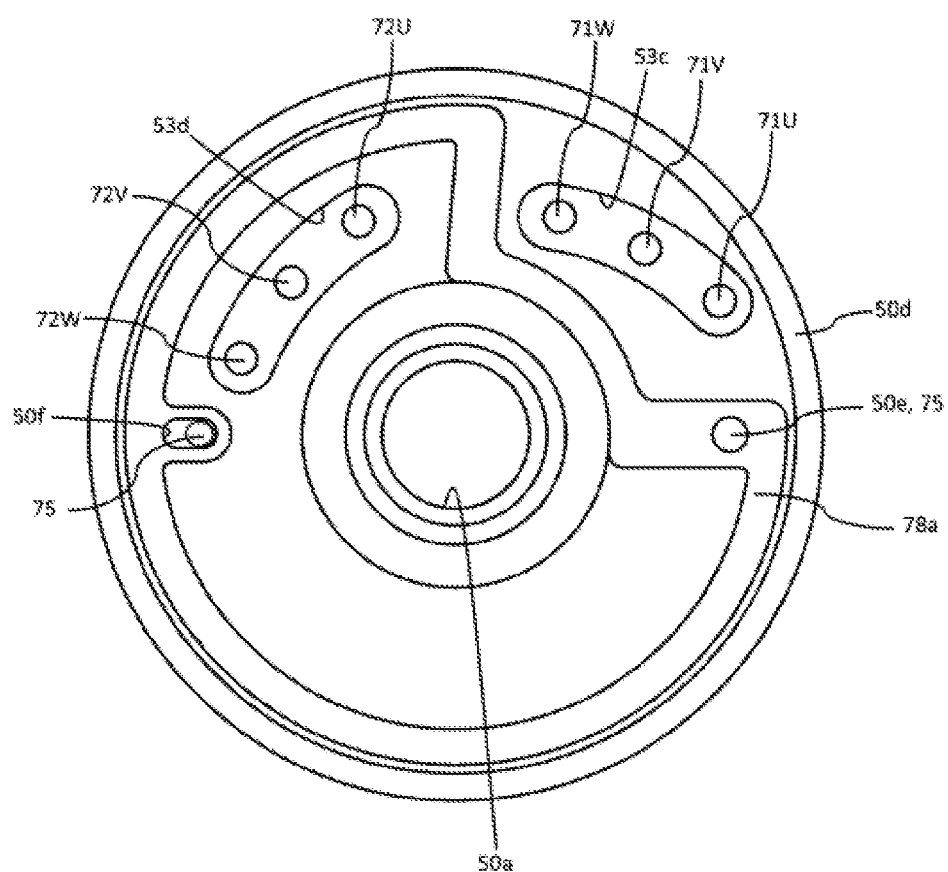
FIG. 13 is a plan view illustrating the holder upper unit of the modification when the holder upper unit is viewed from below.
Figure 14:
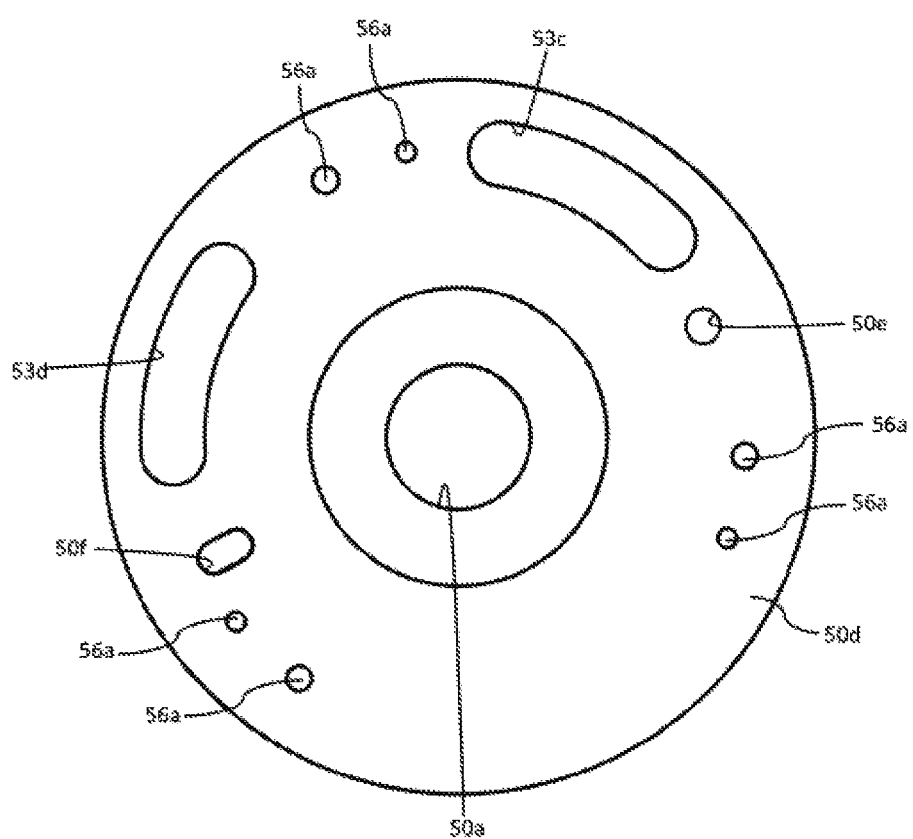
FIG. 14 is a plan view illustrating the state in which the coil lead wire supporting member and a fixing member are removed from the holder upper unit of the modification when the state is viewed from above.

FIGS. 12 to 14 are views relating to a first modification according to the present invention. FIG. 12 is a plan view illustrating a holder upper unit 50d of the first modification when the holder upper unit 50d is viewed from above. FIG. 13 is a plan view illustrating the holder upper unit 50d when the holder upper unit 50d is viewed from below. FIG. 14 is a view illustrating the state in which a coil lead wire supporting member 70e and a fixing member 78a are removed from the holder upper unit 50d when the state is viewed from above. In FIGS. 12 and 13, the fixing member 78a and the coil lead wire supporting member 70e are attached to the holder upper unit 50d.

As illustrated in FIG. 12, the coil lead wire supporting member 70e is disposed above the holder upper unit 50d. The fixing member 78a is disposed below the holder upper unit 50d. The holder upper unit 50d is sandwiched in the vertical direction by the fixing member 78a and the coil lead wire supporting member 70e.

As illustrated in FIG. 12, the coil lead wire supporting member 70e includes a plurality of holes 77a that are through-holes. The coil lead wire supporting member 70e includes the protrusion 75 protruding downward. The fixing member 78a includes a plurality of fixing protrusions 79a protruding upward. As illustrated in FIG. 14, the holder upper unit 50d includes two penetration units 53c and 53d, a hole 50e having a circular section in a direction perpendicular to the axial direction, and a hole 50f having an oval section in a direction perpendicular to the axial direction, and a plurality of fixing through-holes 56a. The hole 50f is a section extending radially. The sectional shape of the hole 50f may be any shape extending radially, and may be an elliptical shape, a rectangular shape, or the like.

The fixing protrusion 79a of the fixing member 78a passes through the fixing through-hole 56a of the holder upper unit 50d to the upper side, and is inserted and fitted in the hole 77a of the coil lead wire supporting member 70e. One of the protrusions 75 of the coil lead wire supporting member 70 is inserted into the hole 50e of the holder upper unit 50d, and the other is inserted into the hole 50f of the holder upper unit 50d. In the embodiment, both the two protrusions 75 are cylindrical, and the protrusion 75 inserted into the hole 50e having the circular section is fitted while the entire outer circumferential surface of the protrusion 75 contacts with the inner circumferential surface of the hole 50e and fitted. On the other hand, the protrusion 75 inserted in the hole 50f having the oval section and extending radially is fitted while a part of the outer circumferential surface contacts with the inner circumferential surface of the hole 50f. Consequently, in manufacturing the motor, the radial position of the coil lead wire supporting member 70e can be adjusted by the hole 50e, and to the circumferential position of the coil lead wire supporting member 70e can be adjusted by the hole 50f. The section of the protrusion 75 in the direction perpendicular to the axial direction does not necessarily have the circular shape, but may have another shape such as a polygonal shape. Similarly, the sections of the holes 50e and 50f into which the protrusions 75 are inserted may have another shape such as a polygonal shape.

Figure 15:
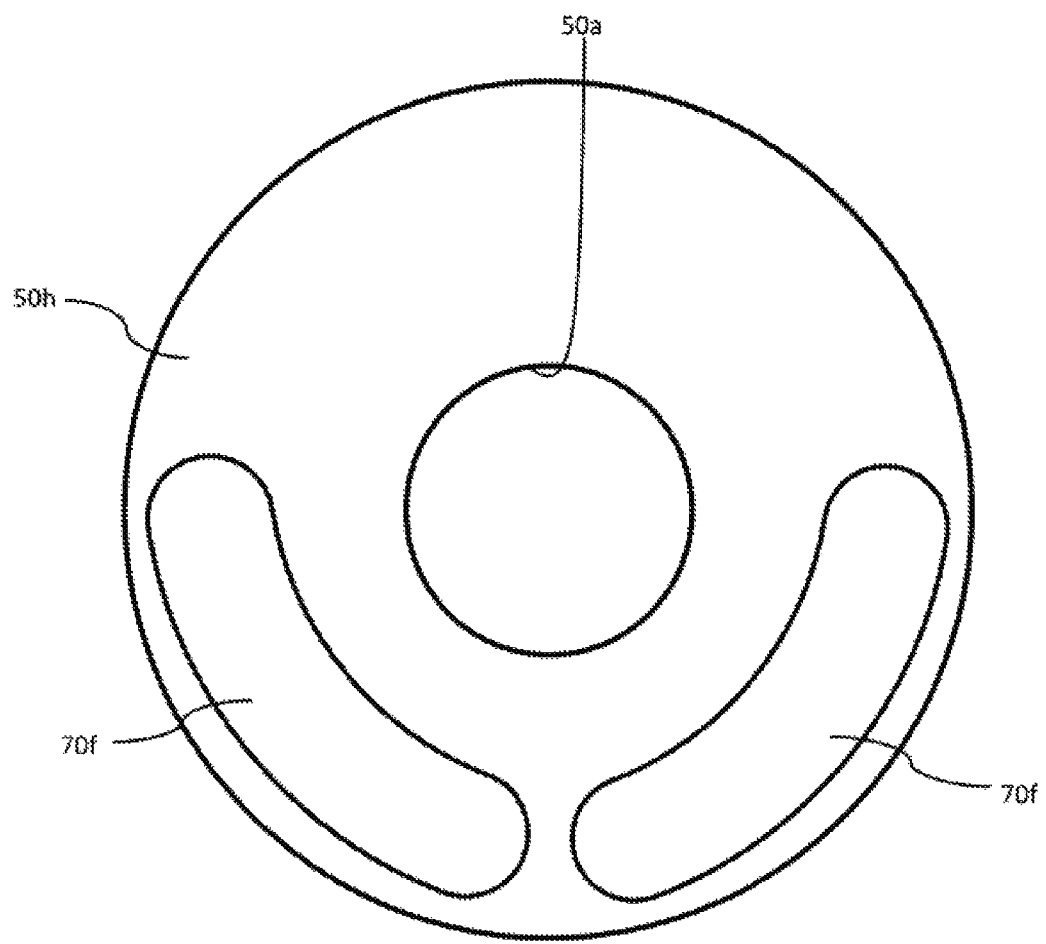
FIG. 15 is a plan view illustrating a top surface of the holder of the modification when the top surface of the holder is viewed from above.
Figure 16:
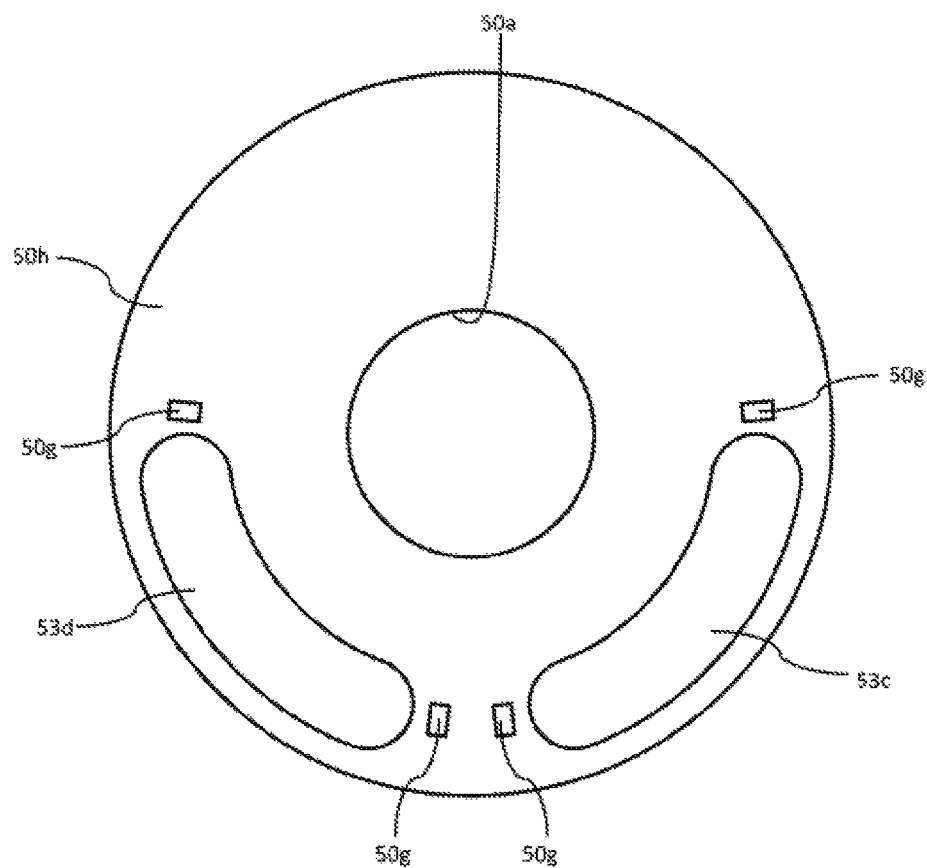
FIG. 16 is a plan view illustrating the state in which the coil lead wire supporting member is removed from the top surface of the holder of the modification when the state is viewed from above.
Figure 17:
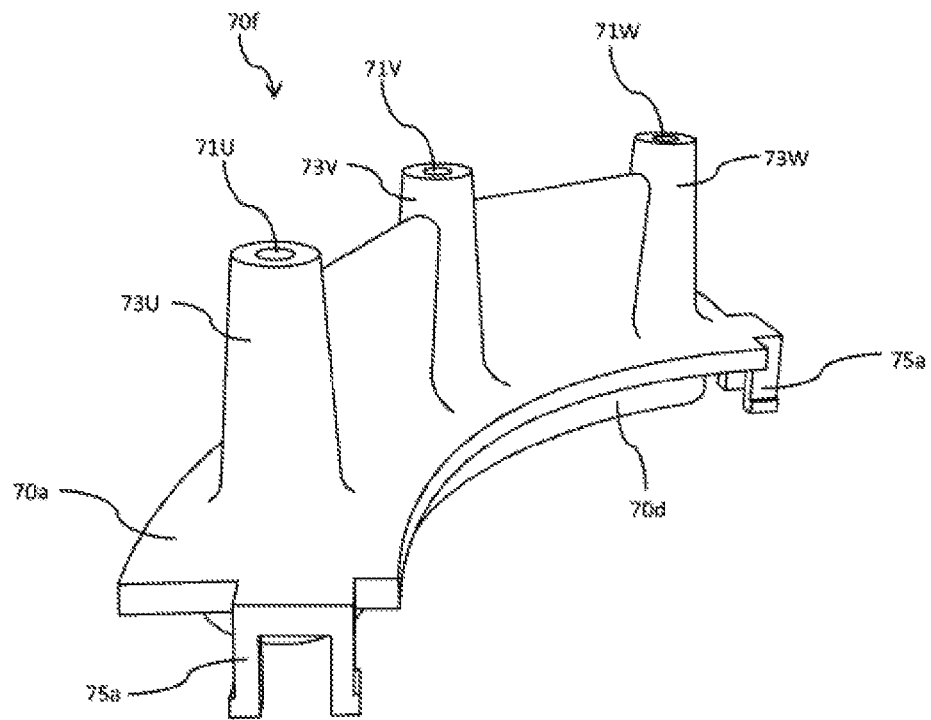
FIG. 17 is a perspective view illustrating the coil lead wire supporting member of the modification when the coil lead wire supporting member is viewed from above.
Figure 18:
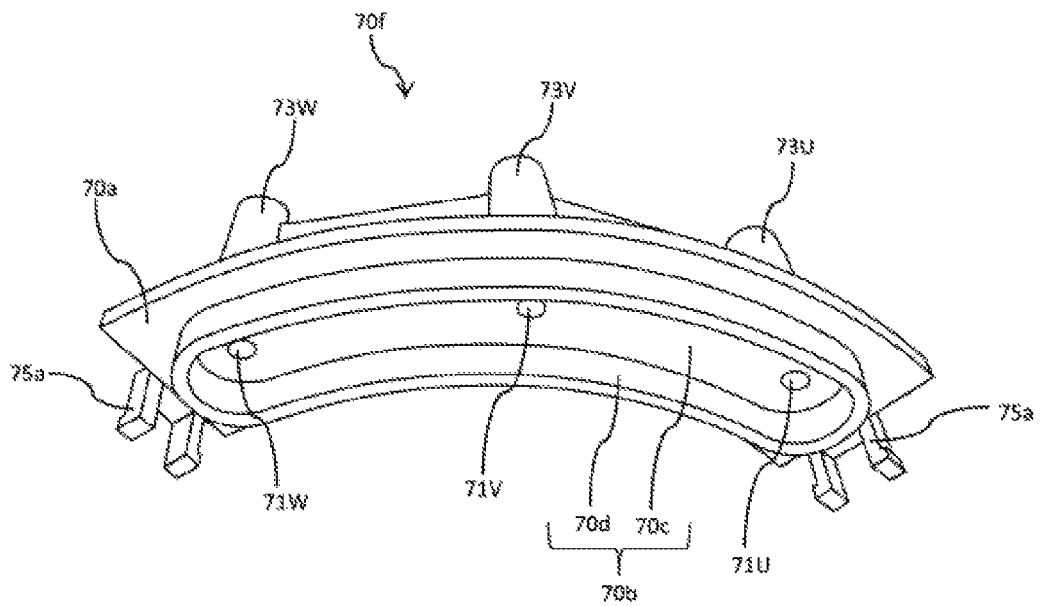
FIG. 18 is a perspective view illustrating the coil lead wire supporting member of the modification when the coil lead wire supporting member is viewed from below.

FIGS. 15 to 18 are views relating to a second modification according to the present invention. FIGS. 15 and 16 are plan views illustrating a holder upper unit 50h of the second modification when the holder upper unit 50h is viewed from above, and a coil lead wire supporting member 70f is removed in FIG. 16. FIG. 17 is a perspective view illustrating the coil lead wire supporting member 70f of the second modification when the coil lead wire supporting member 70f is viewed from above. FIG. 18 is a perspective view of the coil lead wire supporting member 70f of the second modification when the coil lead wire supporting member 70f is viewed from below.

As illustrated in FIGS. 15 and 16, the holder upper unit 50h includes two penetration units 53d and holes 50g on both sides in the circumferential direction of penetration unit 53d.

As illustrated in FIGS. 17 and 18, unlike the embodiment, the coil lead wire supporting member 70f includes three coil lead wire insertion holes 71U to 71W, and has a shape in which the three coil lead wires 90 are inserted into the three coil lead wire insertion holes 71U to 71W while supported. The coil lead wire supporting member 70f includes protrusions 75a protruding downward at both ends. Two protrusions 75a are paired. The protrusion 75a is a region that can elastically be deformed in the circumferential direction or the radial direction. The coil lead wire supporting member 70f is inserted into the penetration unit 53c or 53d of the holder upper unit 50h, and the protrusion 75 is inserted into the hole 50g while elastically deformed. Consequently, not only the fitting unit 70b is fitted in the penetration unit 53c or 53d, but also the protrusion 75 presses the inside of the hole 50g, so that the coil lead wire supporting member 70f can firmly be fixed to the holder upper unit 50h.

In the case that the holder upper unit 50 is sandwiched between the fixing member 78 and the coil lead wire supporting member 70, it is necessary to make a through-hole in the base. However, in the structure of FIGS. 17 and 18, it is not necessary to make the through-hole in the base, the resin material for the portion in which the through-hole is made in the base can be reduced, and the shape of the mold used to mold the base can be simplified.

Figure 19:
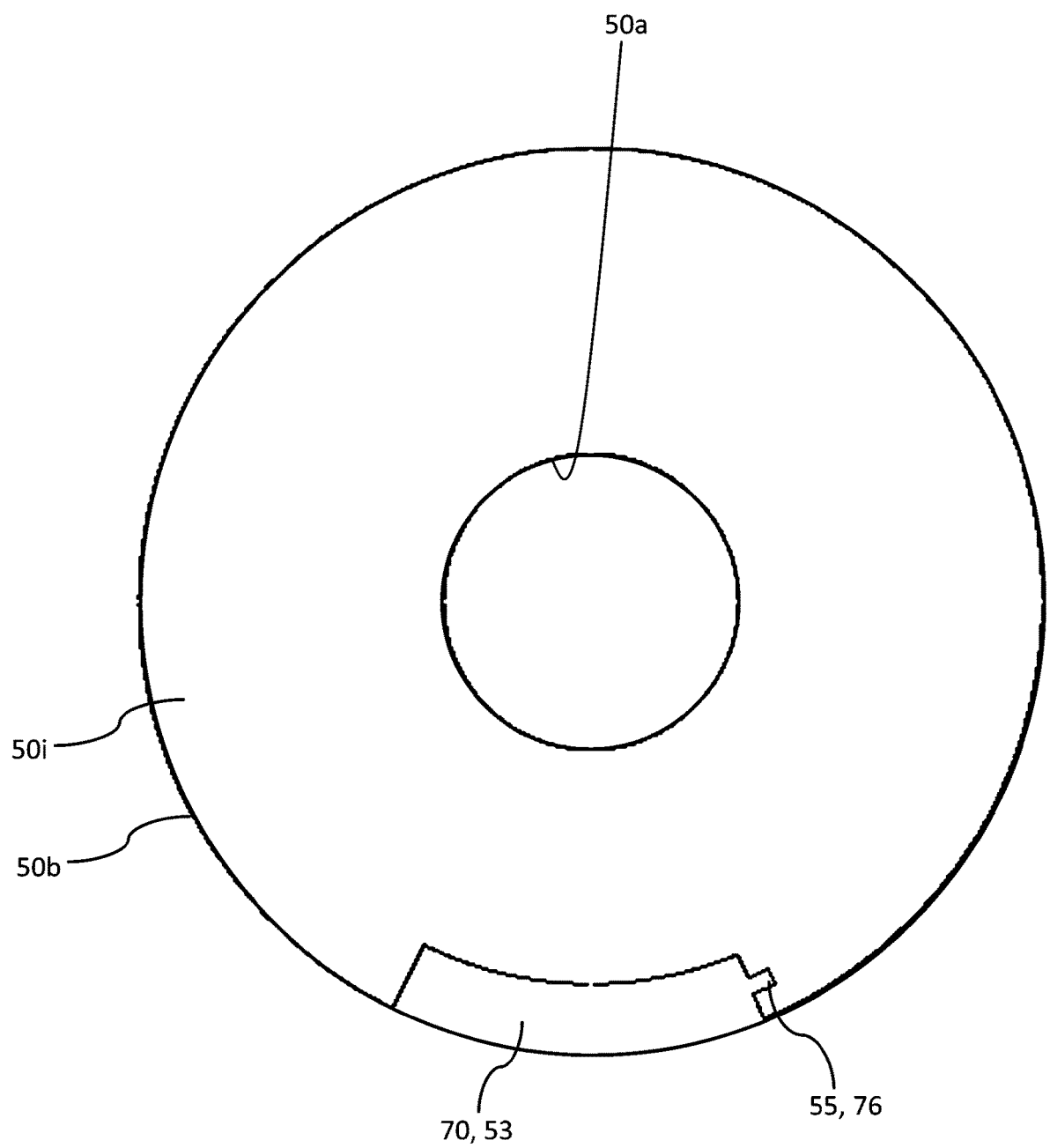
FIG. 19 is an enlarged plan view illustrating a vicinity of a penetration unit in the holder upper unit of the modification.

FIG. 19 is an enlarged plan view illustrating the vicinity of the penetration unit 53 of a holder upper unit 50i according to a third modification of the present invention. More particularly, FIG. 19 is a sectional view when the coil lead wire supporting member 70 is fitted in the penetration unit 53. The coil lead wire supporting member 70 of the third modification circumferentially includes a protrusion 76. The holder upper unit 50i includes a recess 55 at a circumferential position opposite to the protrusion 76. In the third modification, the protrusion 76 of the coil lead wire supporting member 70 and the recess 55 of the holder upper unit 50i are circumferentially fitted to each other. Thereby, the coil lead wire supporting member 70 and the holder upper unit 50i are firmly fixed to each other.

In the motor 1 of the third modification, the coil lead wire supporting member 70 includes the protrusion 76, and the holder upper unit 50i includes the recess 55 fitted to the protrusion 76, so that the coil lead wire supporting member 70 and the holder upper unit 50 can firmly be fixed to each other. Additionally, the coil lead wire supporting member 70 and the holder upper unit 50i can easily be positioned.

The embodiment and modifications of the present invention are specifically described above. The above description is merely an embodiment, and the scope of the present invention is not limited to the embodiment, but is broadly interpreted to an extent that those skilled in the art can grasp. For example, the embodiment and modifications can be implemented in combination with each other.

For example, the present invention can be applied to an in-vehicle motor for an electric power steering, a pump, and a compressor.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A motor comprising:
    a rotor including a shaft centered on a center axis extending vertically;
    a stator that is radially opposed to the rotor and includes a plurality of coils;
    a holder that is made of a conductive material, accommodates the rotor and the stator, and includes a penetration unit penetrating axially;
    a coil lead wire support that is at least partially disposed in the penetration unit, includes a coil lead wire insertion hole into which a plurality of coil lead wires extending from the plurality of coils are inserted, and is made of an insulating material; and
    a fixing member that sandwiches the holder together with the coil lead wire support; wherein
    the coil lead wire support includes:
    a base; and
    a fitting unit extending downward from the base, at least one of a circumferential length and a radial length of the fitting unit being shorter than the base;
    the coil lead wire insertion hole is provided in the base and the fitting unit, and the coil lead wire is inserted into the coil lead wire insertion hole;
    the holder includes a fixing through-hole; and
    the fixing member includes a fixing protrusion that is coupled to the coil lead wire support while penetrating the fixing through-hole.

2. The motor according to claim 1, wherein
    the fitting unit includes a bottom surface disposed on a lower side of the base and a wall extending downward from an outer circumference of the bottom surface; and
    the coil lead wire insertion hole is disposed in the bottom surface.

3. The motor according to claim 1, wherein
    the coil lead wire support includes a protrusion protruding upward from the base; and
    the coil lead wire insertion hole penetrates the base, the fitting unit, and the protrusion.

4. The motor according to claim 1, wherein
    an inner diameter on an upper side of an inner circumferential surface of the coil lead wire insertion hole is at least partially decreased; and
    a surface of the coil lead wire located in the protrusion is a conductor.

5. The motor according to claim 4, wherein
    the coil lead wire located in the protrusion includes a conductive unit in which a surface is a conductor and an insulating unit in which a surface is an insulator; and
    the conductive unit is disposed in a portion in which an inner diameter on the upper side of the inner circumferential surface of the coil lead wire insertion hole is decreased.

6. The motor according to claim 1, wherein an outside surface of the fitting unit contacts with an inside surface of the penetration unit.

7. The motor according to claim 1, wherein
    the coil lead wire support includes a protrusion or a recess in a side surface of the fitting unit;
    the holder includes a recess or a protrusion at a position opposed to the protrusion or the recess of the fitting unit; and
    the protrusion and the recess are fitted to each other.

8. The motor according to claim 1, wherein
    the coil lead wire support includes a protrusion protruding downward from the base;
    the holder includes a recess or a hole at a position opposed to the protrusion; and
    the protrusion and the recess or the hole are fitted to each other.

9. The motor according to claim 8, wherein
    the coil lead wire support includes at least two protrusions; and
    the holder includes at least two of the recesses or the holes at positions opposed to at least two of the protrusions.

10. The motor according to claim 9, wherein at least two of the recesses or the holes include a recess or a hole with a circular section and a recess or a hole with an elliptical or oval section.

11. The motor according to claim 1, wherein the coil lead wire support includes one base and at least two fitting units.

* * * * *